United States Patent
Yamane et al.

(10) Patent No.: US 6,920,180 B1
(45) Date of Patent: Jul. 19, 2005

(54) IMAGE PROCESSING INSPECTION APPARATUS

(75) Inventors: Toshiki Yamane, Osaka (JP); Kazutaka Ikeda, Osaka (JP); Kazuo Sawada, Osaka (JP); Yoshimasa Fujiwara, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/701,369

(22) PCT Filed: May 28, 1999

(86) PCT No.: PCT/JP99/02868

§ 371 (c)(1),
(2), (4) Date: Feb. 27, 2001

(87) PCT Pub. No.: WO99/63484

PCT Pub. Date: Dec. 9, 1999

(30) Foreign Application Priority Data

May 29, 1998 (JP) .......................................... 10/150058

(51) Int. Cl.[7] ............................................... H04N 7/18
(52) U.S. Cl. .................. 375/240.26; 348/715; 348/717; 348/719; 348/721
(58) Field of Search ....................... 375/240.08–240.17; 348/713–721, 86–98, 125–141

(56) References Cited

U.S. PATENT DOCUMENTS 5,495,337 A * 2/1996 Goshorn et al. ............ 356/601
5,608,453 A * 3/1997 Gerber et al. ................ 348/87
6,137,528 A * 10/2000 Ashizaki ...................... 348/86
6,333,992 B1 * 12/2001 Yamamura et al. ......... 382/149

OTHER PUBLICATIONS

Epix Vision–Oct. 1994 Newsletter, 'Online! Oct. 1994, pp. 1–2, XP002117629; Retrieved from the Internet: <URL: http://www2.interaccess.com/epix/v3an4al.htm> 'retrieved on Oct. 5, 1999! p. 1.*

Epix Vision–Oct. 1994 Newsletter, 'Online! Oct. 1994, pp. 1–2, XP002117630; Retrieved from the Internet: <URL: http://www2.interaccess.com/epix/v3n4a3.htm> 'retrieved on Oct. 06, 1999! p. 1 line 1.*

Harney K et al: "The 1750R Video Processor: A Total Multimedia Solution" Communications of the Associations for Computer Machinery, vol. 34, No. 4, Apr. 1, 1991, pp. 64–78, XP000228790 ISSN: 0001–782, p. 65– p. 69.*

* cited by examiner

*Primary Examiner*—Andy Rao
(74) *Attorney, Agent, or Firm*—Oblon, Spivak, McClelland, Maier & Neustadt, P.C.

(57) ABSTRACT

In the present invention, the same image data, captured by a TV camera, is processed by the use of an image-processing board connected to an extension bus constituted by a personal computer and a CPU board inside the personal computer so that the CPU board and the image-processing board are allowed to execute the image processes in parallel with each other.

13 Claims, 13 Drawing Sheets

[FIG. 1]
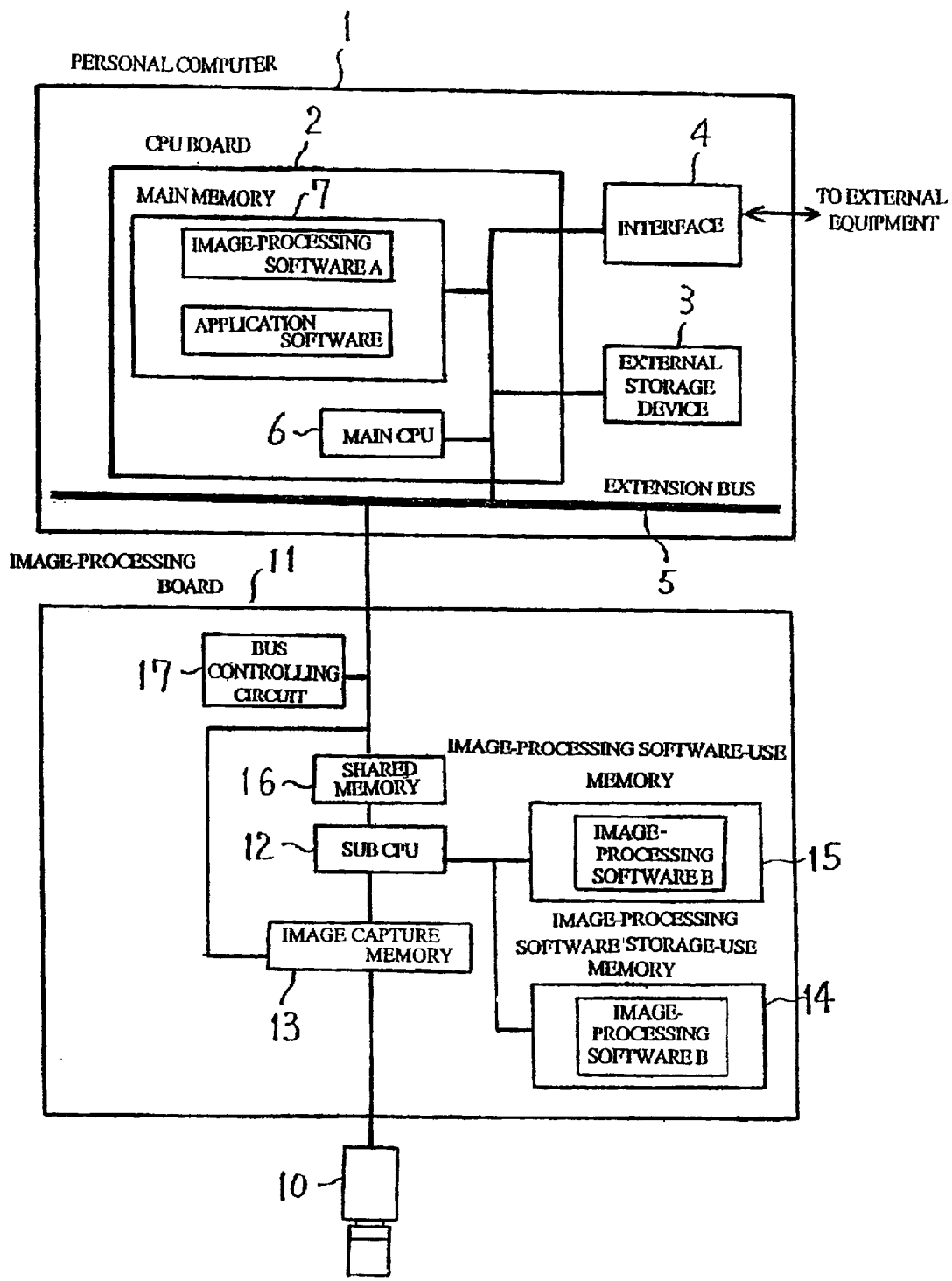

[FIG. 2]
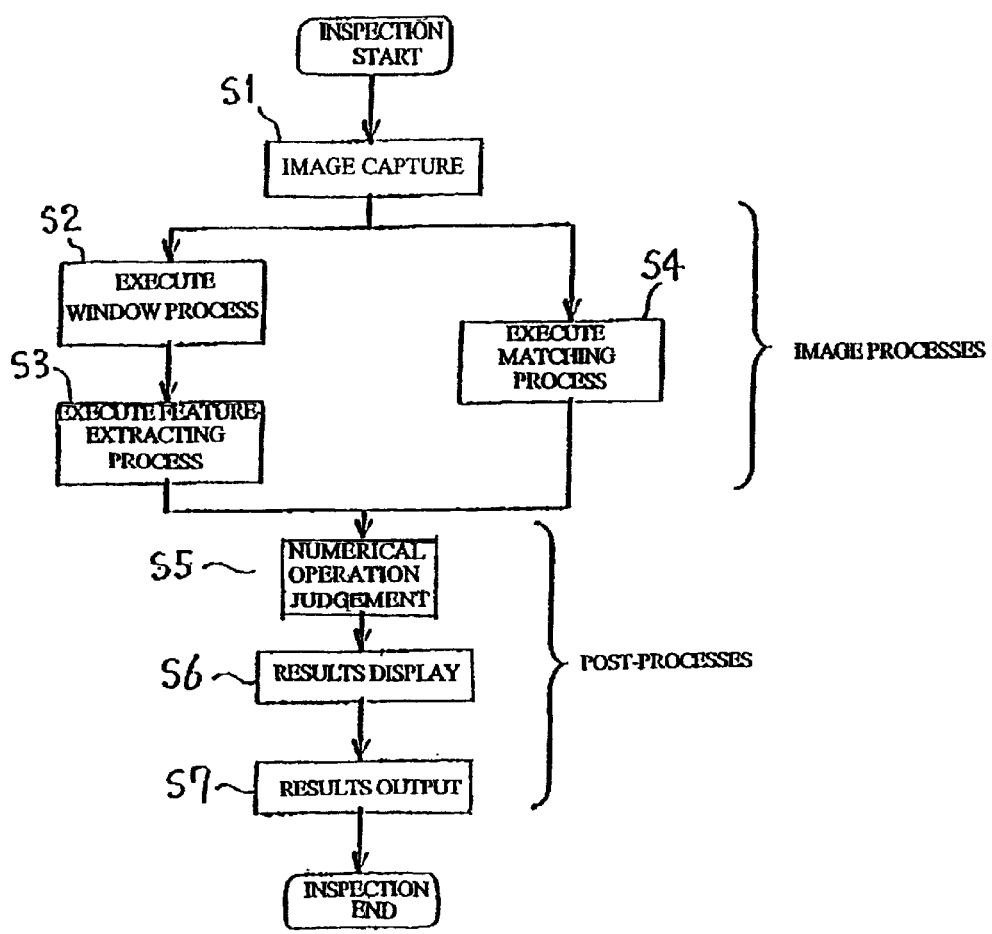

[FIG. 3]
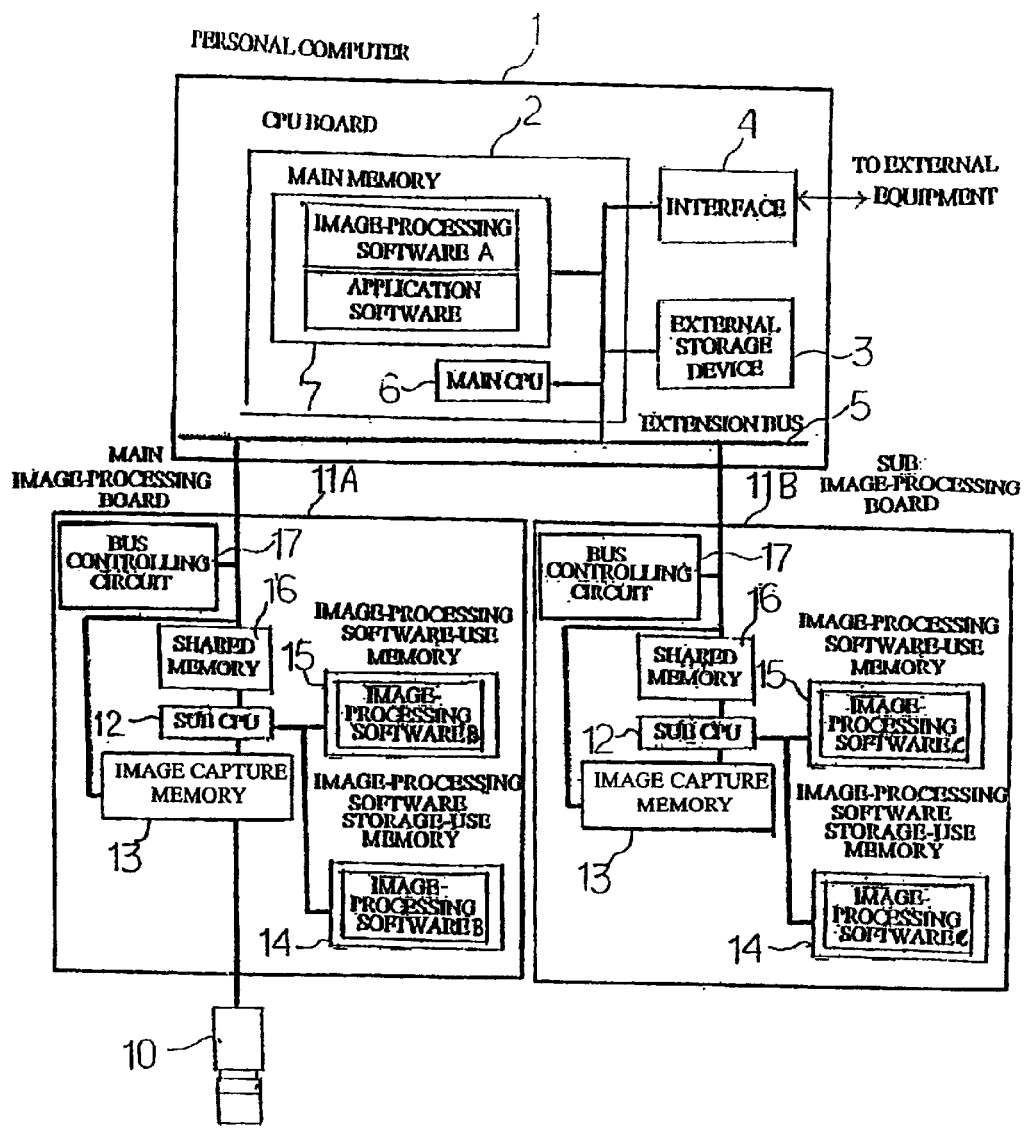

[FIG. 4]
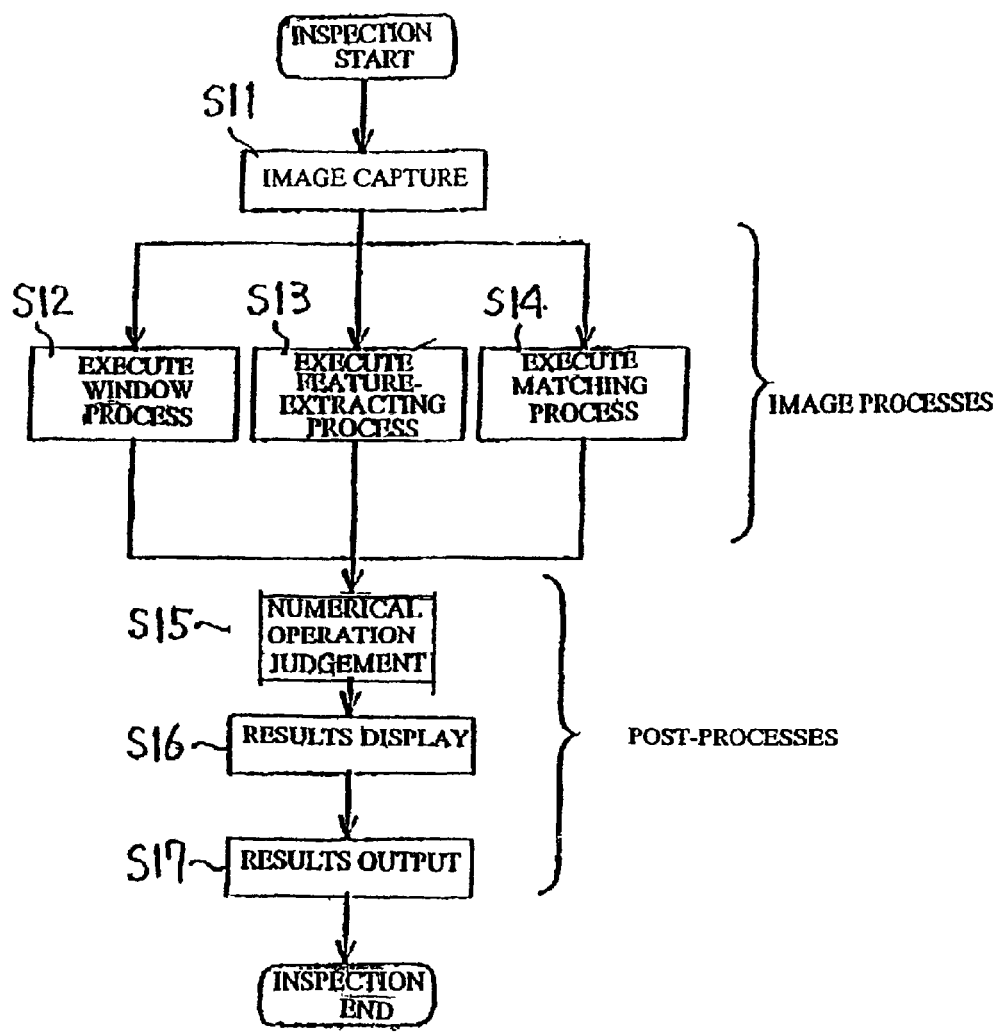

[FIG. 5]
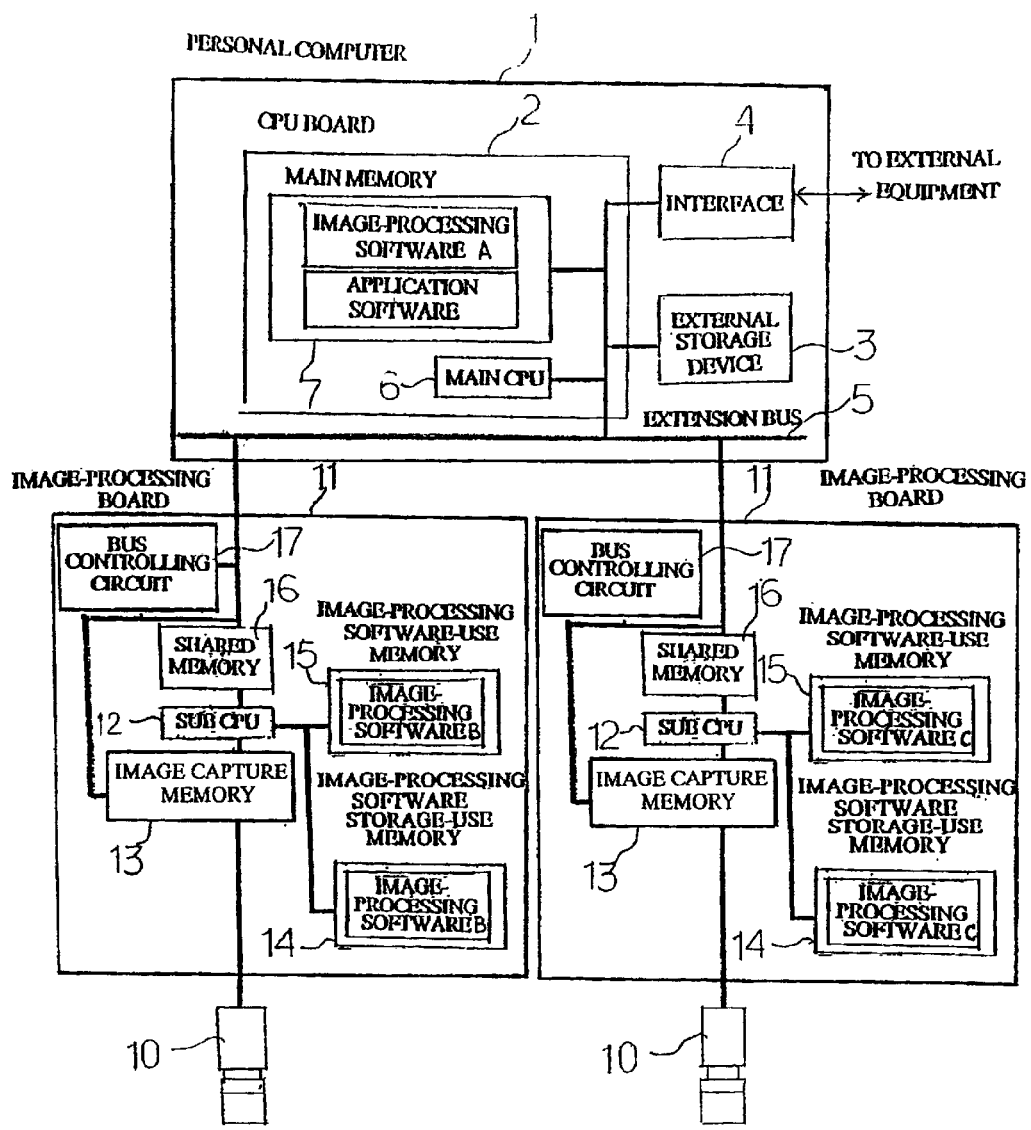

[FIG. 6]
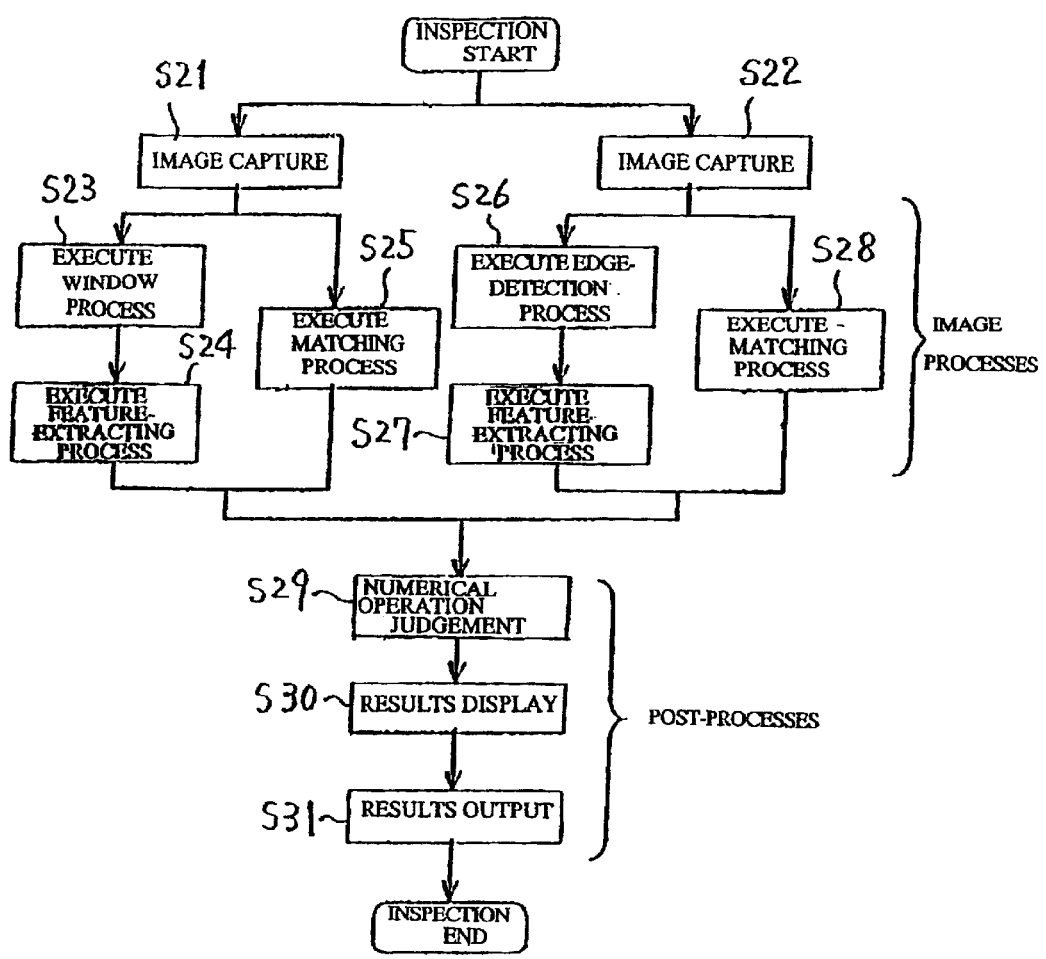

[FIG. 7]
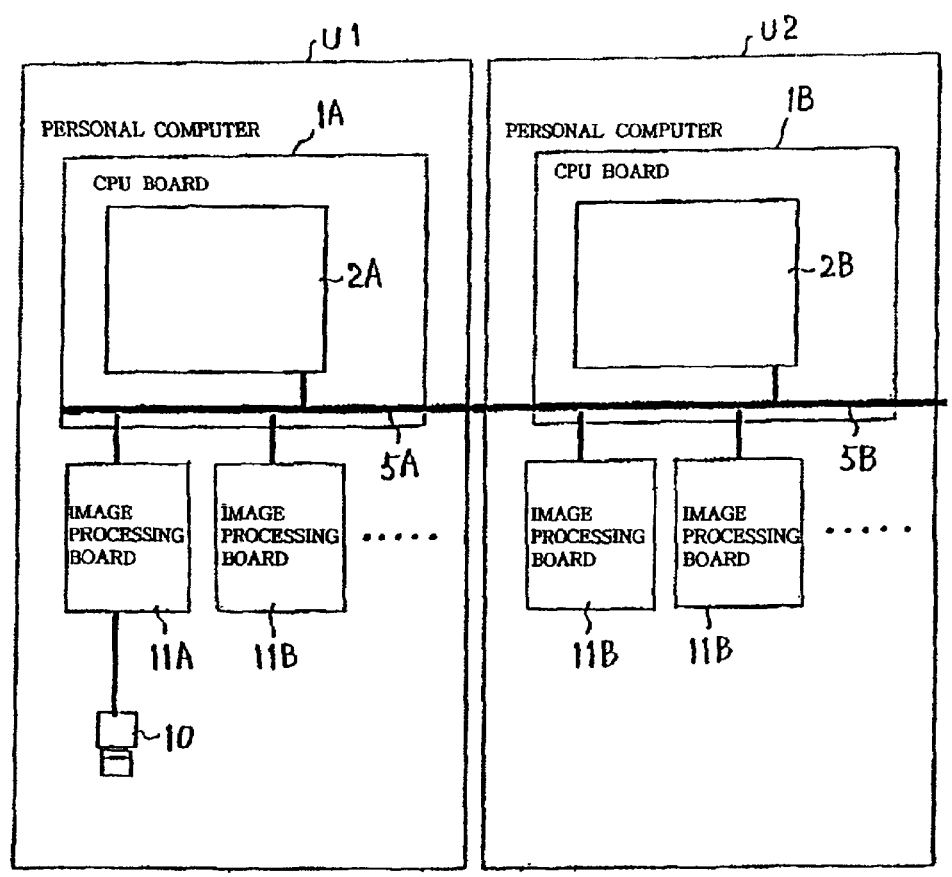

[FIG. 8]
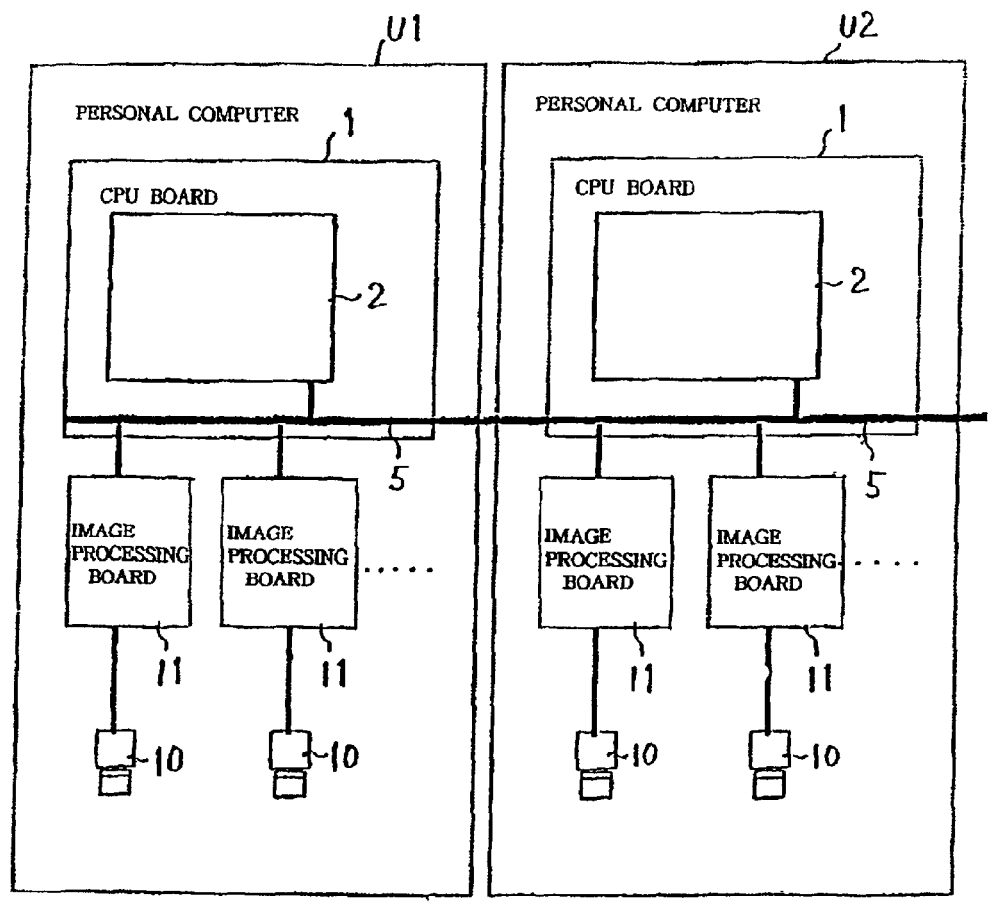

[FIG. 9]
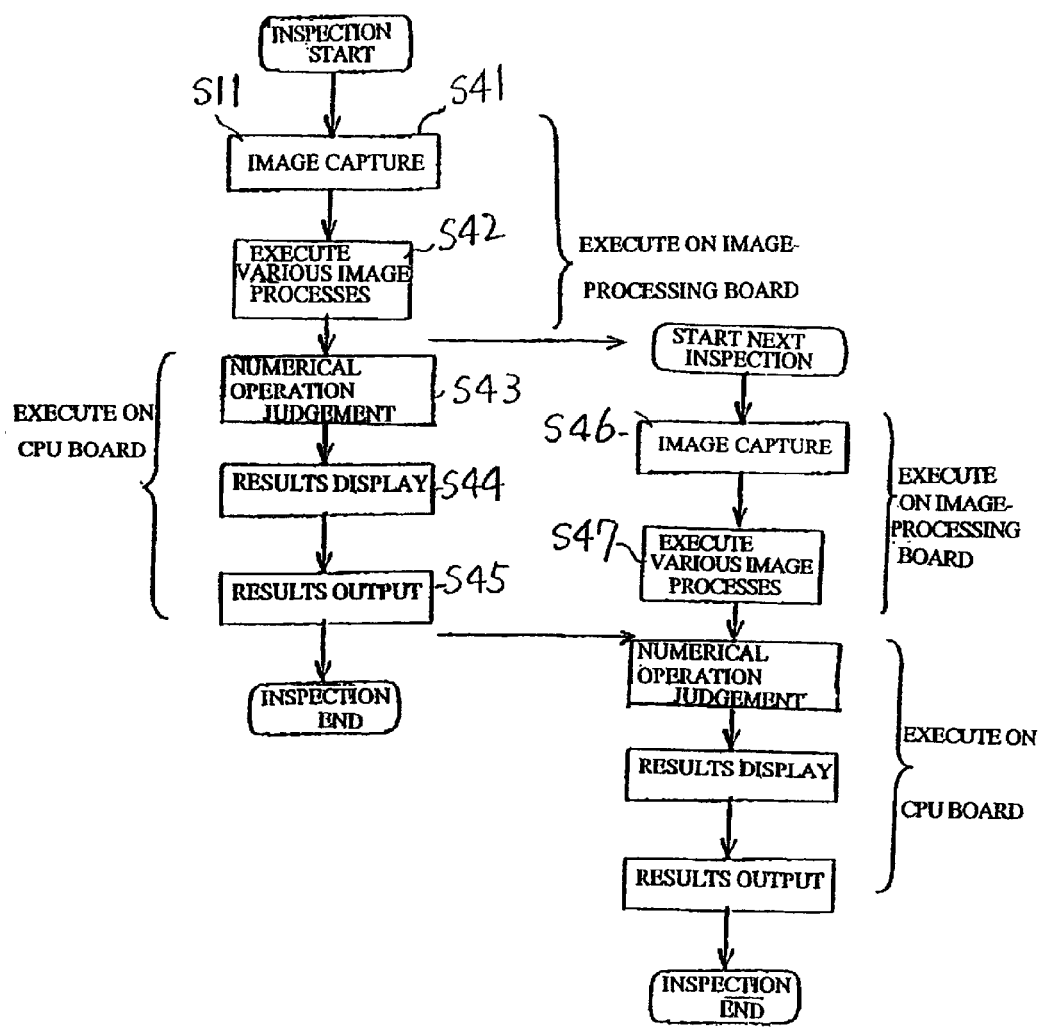

[FIG. 10]
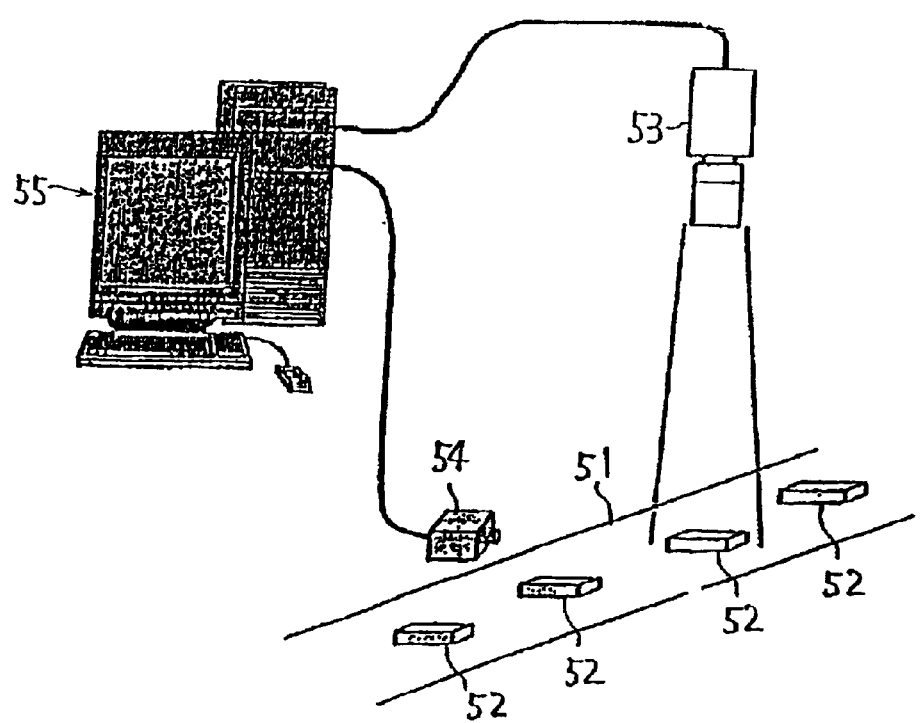

[FIG.11]
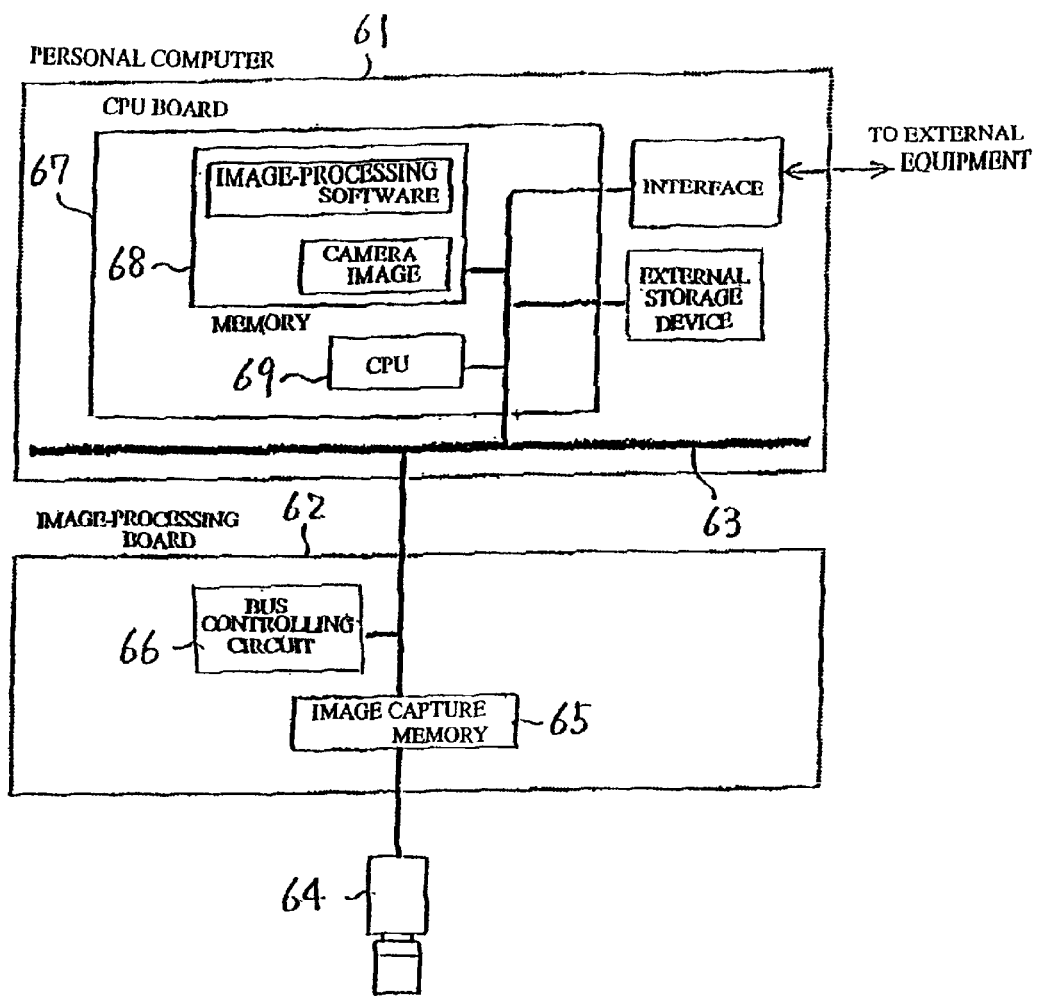

[FIG.12]
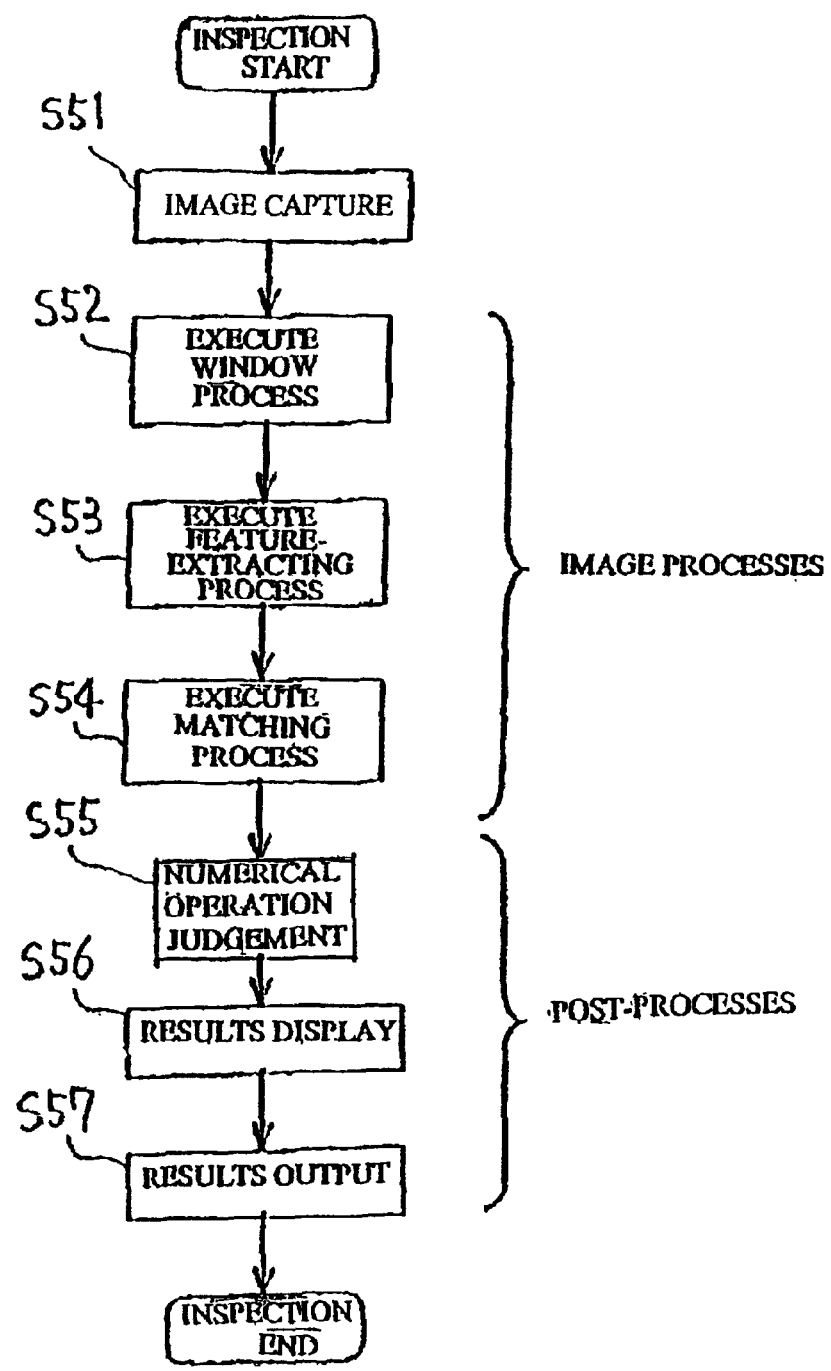

[FIG.13]
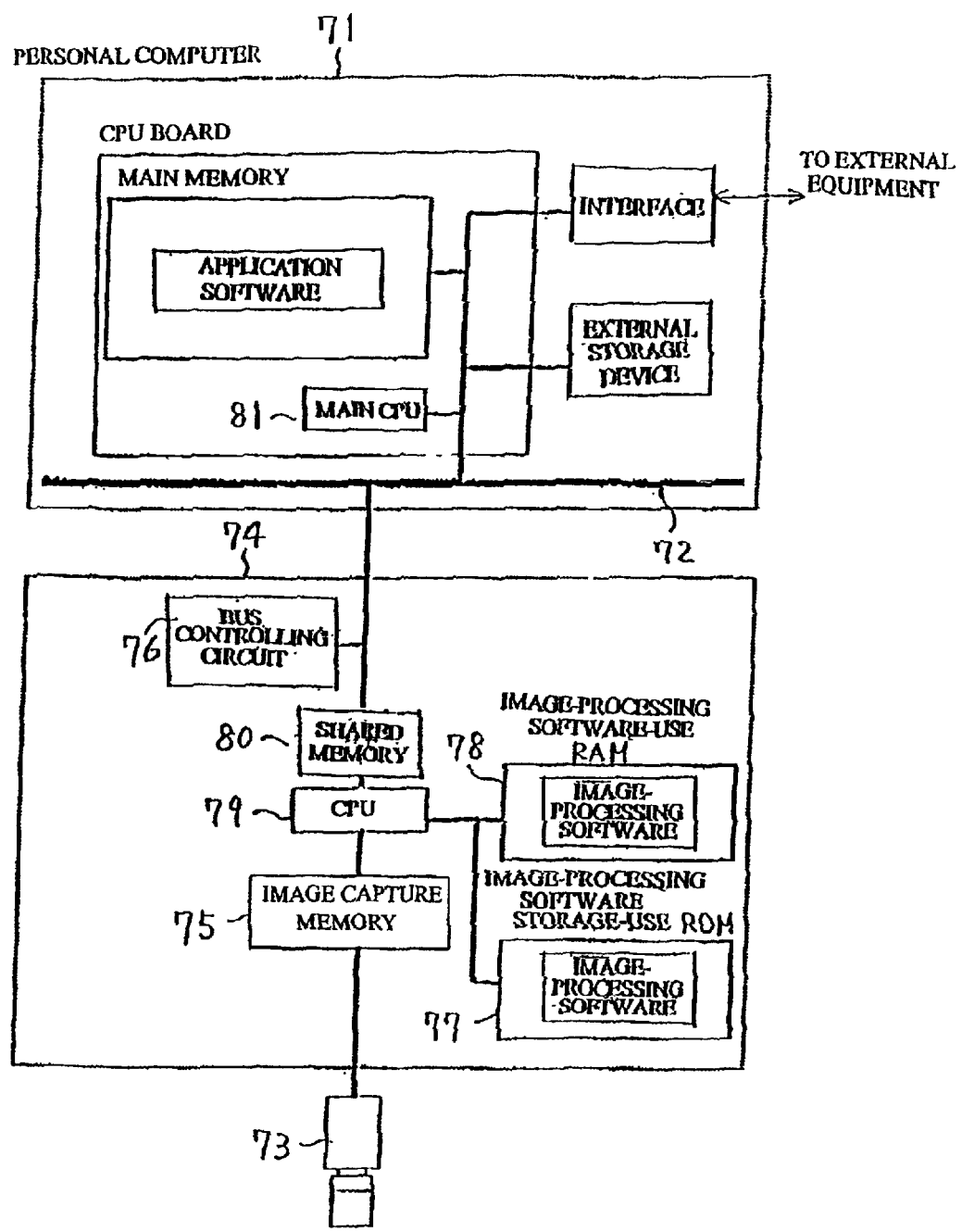

IMAGE PROCESSING INSPECTION APPARATUS

FIELD OF THE INVENTION

The present invention relates to an image processing inspection apparatus used as production equipment for industrial uses in judging the quality of products in manufacturing processes and an inspection method for such an apparatus.

BACKGROUND OF THE INVENTION

Lately, an increasing number of controlling apparatuses and inspection apparatuses that use personal computers as a base system have been introduced into manufacturing processes in factories and the like. In particular, windows OS systems (for example, Windows 95, Windows 98, Windows NT, etc. of Microsoft Corp.) have superior HMIs (Human-Machine Interfaces). For this reason, in those apparatuses using personal computers as their basic systems, there are great advantages for the user to be able to operate various pieces of software, such as word processing software, spreadsheet software, graphics drawing software, data base software, etc. based upon common techniques on the windows OS system.

Recently, with respect to various controlling operations such as, for example, positioning control for robots, a piece of dedicated hardware relating to a specific controlling operation is connected to a personal computer, and the operation can be carried out by using application software on the windows OS system.

Another advantage of using windows OS systems is that data exchanges can be easily carried out between different kinds of application software. For example, in those typical windows OS systems of Microsoft Corp., Windows 95, Windows 98 and Windows NT, commands can be sent and data can be updated and received from one application to another application in a dynamic manner using OLE (Object Linking and Embedding) technique.

Meanwhile, a number of image processing inspection apparatuses have been introduced into factories and the like as production equipment that can perform various visual inspections, which used to be dependent on human visual sense, accurately, automatically, with high speeds. In such a field of image processing inspection apparatuses, apparatuses have also been developed in which a board is inserted into an extension bus in a personal computer so that control is provided by using pieces of application software, for example, on a windows OS system.

In general, the image processing inspection apparatus is used for inspecting the quality, etc. of products on a production line, for example, as shown in FIG. 10. Products (hereinafter, referred to as targets) 52, carried on a conveyor belt 51, are photographed by a TV camera 53, and with respect to the photographed images, various image processes, such as a position-correcting process, an area-measuring process and a center-of-gravity-position calculating process, are carried out. Then, a sequence of operation outputting processes are carried out in which numerical operations are carried out on the results of the image processes; based upon the values thus found, logical operations for judging the quality of the inspected products are carried out; and the results are then outputted.

Conventionally, the above-mentioned sequence of processes were achieved by developing exclusive hardware and the exclusive piece of software that operates on the hardware. However, in recent years, with the rapid developments of functions of the CPU in personal computers, a number of apparatuses for carrying out all these processes in the CPU of a personal computer have been developed.

In other words, when a target 52, carried on the conveyor belt 51 is detected by a sensor 54, a detection signal is sent to a personal computer 55 as a trigger input for starting detection, and an image on TV camera 53 is captured. Here, the personal computer 55 is provided with, for example, parallel interface inputs, and when the detection signal is inputted to its terminal, the detection is started so as to capture the image. Thereafter, the above-mentioned image processes and sequence of operation output processes are carried out by the personal computer 55.

FIG. 11 shows a structural example of such an image processing detection apparatus. A personal computer 61 is installed as a central processing control device, and an image capture board 62 is inserted into an extension bus 63 (connector connection) of the personal computer 61. The board 62, which has a simple construction with an image capture memory 65 for storing image data from the TV camera 64 and a bus controlling circuit 66, is manufactured at low costs. The bus-controlling circuit 66 transmits the image data captured and stored in the image capture memory 65 to a memory 68 on a CPU board 67 inside the personal computer 61.

For example, in the case when the extension bus 63 has a PCI bus construction, a number of image capture boards, which can directly control the bus and transmit image data to the memory 68 on the CPU board 67, are commercially available. The camera image that has been stored in the memory 68 on the CPU board 67 is processed by the CPU 69 by using image-processing software that has been loaded in the same memory 68.

FIG. 12 shows a specific example of the processing sequence. First, after an image is captured as described above at step S51, image processes, such as a window process (S52), a feature-extracting process (S53) and a matching process (S54), are successively carried out. Next, based upon the results of these image processes, post-processes, such as numerical-operation and judging processes (S55), a result-displaying process (S56) and a result-outputting process (S57), are carried out.

Here, the window process refers to a process in which, in the case of a binarizing process, the number of pixels in areas (specified color (white or black)) within a set region is found, and in the case of a light and shade process, the sum or the average value of light and shade pixels within a set region is found. The feature-extracting process refers to a process in which the amounts of features (coordinates of center of gravity, areas, peripheral length, circumscribing rectangles, inertial main axis, etc.) of respective lands (independent lumps each having a specified color (white or black)) within a region set by a binarizing process are found. The matching process refers to a process in which, in the light and shade process, based upon the degree of coincidence (coefficient of correlation) as to where a preliminary extracted template image exists within a set region, coordinates, angles and other factors are found.

Here, one of the indications in estimating the functions of an image processing inspection apparatus is how fast it executes processes. In the above-mentioned construction, for example, when different applications are executed on the same personal computer by using a multi-task mode, the ratio of time that the CPU can allocate to image processes is reduced, with the result that the image-processing time is greatly lengthened.

In contrast, for example, in 4MEG VIDEO Model 12 introduced by EPIX VISION-OCTOBER 1994 NEWSLETTER, [Online]October 1994(1994–10), pages 1–2, XP002117630 Retrieved from the Internet: <URL http://www2. interaccess.com/epix/v3n4 a3.htm>, in addition to a data picking-up process for image data from a digital camera, a function for carrying out image processing is also provided. Therefore, an image processing board also having such an image processing function is connected to an extension bus of a personal computer so as to develop an image processing inspection apparatus.

Here, in EPIX VISION-OCTOBER 1994 NEWSLETTER, [Online]October 1994(1994–10), pages 1–2, XP002117629 Retrieved from the Internet: <URL:http://www2.interaccess.com/epix/v3an 4a1.htm>, twin C40s, which are installed in the 4MEG VIDEO Model 12. have been introduced. An explanation is given of the fact that image data, picked up by the 4MEG VIDEO Model 12, is transferred to these C40s where image processing is respectively carried out thereon so that it becomes possible to further improve the image processing capability.

An image processing board having an image processing function is formed by using such a 4MEG VIDEO Model 12 (or 4MEG VIDEO Model 12 equipped with twin C40s), etc., and this is connected to an extension bus 72 of a personal computer 71 so as to construct an image processing inspection apparatus; and an example thereof is shown in FIG. 13.

In this Figure, an image processing board 74, connected to the extension bus 72 of the personal computer 71, is provided with an image capturing memory 75 for capturing images from a TV camera 73, a bus controlling circuit 76, a ROM 77 for storing image processing software, in which image processing software is stored, a RAM 78 used for the image processing software, in which the image processing software is loaded at the time of activation, and a CPU 79 that is operated in accordance with the image processing software.

In this apparatus, an image process which has to be executed as short a time as possible is executed by the CPU 79 on the image-processing board 74. In the personal computers 71, in accordance with pieces of application software, processes, such as setting changes in parameters of various processes, displaying of image-processing areas, displaying of results, numerical operations, and setting and displaying of logical operations, are carried out.

The image-processing board 74 and the personal computer 71 share data through the extension bus 72 by using, for example, a shared memory (dual port memory element) 80. Since any image data appears on the extension bus 72, it is possible to cut the amount of data to be transferred. Moreover, since the CPU 79 on the image-processing board 74 carries out image processes, it is possible to reduce loads imposed on the main CPU 81 inside the personal computer 71. Additionally, instead of the memories 77, 78 and the CPU 79 of the image-processing board 74, exclusive hardware for image-processing such as a large-scale gate array and an ASIC may also be used.

However, the contents of image processes that can be executed by using the above-mentioned image-processing board 74 are limited by software preliminarily stored in the image-processing program storage-use ROM 77 or the exclusive hardware such as the gate array installed on the image-processing board; this raises a problem of lack of flexibility.

The present invention has been developed in view of the above points and it has an object to provide an image processing inspection apparatus which can achieve high-speed processes for the apparatus as a whole and can reduce loads imposed on the CPU of the central processing control device on demand, and an inspection method using such an apparatus.

SUMMARY OF THE INVENTION

In the image processing inspection apparatus and the inspection method of the present invention, the same image data, captured by a TV camera, is processed by the use of an image-processing board connected to an extension bus of a central processing control device constituted by a personal computer and a CPU board inside the central processing control device so that the CPU board and the image-processing board are allowed to appropriately share and execute the image processes in parallel with each other.

Moreover, in the image processing inspection apparatus and the inspection method of the present invention, image data, captured by a TV camera, is subjected to an image process by the image-processing board connected to the extension bus of the central processing control device, while the image data is also subjected to a post-process carried out by the CPU board inside the central processing control device based upon the results of the image process. Here, these image process and post-process are carried out in parallel with each other.

BRIEF DESCRIPTION OF THE DRAWINGS

FIG. 1 is a block diagram that shows a construction of an image processing inspection apparatus in accordance with embodiment 1 of the present invention.

FIG. 2 is a flow chart that shows a sequence of processes in the apparatus of embodiment 1.

FIG. 3 is a block diagram that shows a construction of an image processing inspection apparatus in accordance with embodiment 2 of the present invention.

FIG. 4 is a flow chart that shows a sequence of processes in the apparatus of embodiment 2.

FIG. 5 is a block diagram that shows a construction of an image processing inspection apparatus in accordance with embodiment 3 of the present invention.

FIG. 6 is a flow chart that shows a sequence of processes in the apparatus of embodiment 3.

FIG. 7 is a block diagram that shows a construction of an image processing inspection apparatus in accordance with embodiment 4 of the present invention.

FIG. 8 is a block diagram that shows a construction of an image processing inspection apparatus in accordance with embodiment 5 of the present invention.

FIG. 9 is a flow chart that shows a sequence of processes in the image processing inspection apparatus in accordance with embodiment 6 of the present invention.

FIG. 10 is an explanatory drawing that shows one example of inspection carried out by an image processing inspection apparatus.

FIG. 11 is a block diagram that shows a construction of a conventional image processing inspection apparatus.

FIG. 12 is a flow chart that shows a sequence of processes in the conventional image processing inspection apparatus.

FIG. 13 is a block diagram that shows a construction of another conventional image processing inspection apparatus.

DETAILED DESCRIPTION OF THE PREFERRED EMBODIMENT

Embodiment 1

FIG. 1 shows a construction of an image processing inspection apparatus in accordance with embodiment 1. This apparatus is provided with a personal computer 1 as its central processing control device, and an external storage device 3 constituted by a CPU board 2, a hard disk, etc., an interface 4 and a general-use extension bus (for example, a PCI bus) 5 are installed in the personal computer 1.

The CPU board 2 is provided with a main CPU 6 and a main memory 7. Upon starting the personal computer 1, an OS program (not shown) is loaded to the main memory 7 from the external storage device 3, and image-processing software A and application software are also loaded thereto (or loaded at the time of executing in some cases).

An image-processing board 11 to which a TV camera 10 is connected is inserted (connector connection) into the extension bus 5.

A CPU (hereinafter, referred to as a sub CPU) 12, which is exclusively used for image processing, is installed in the image-processing board 11 in a separate manner from the main CPU 6 inside the personal computer 1. Moreover, in the board 11 are installed an image capture memory 13 for receiving and storing an image captured by the TV camera 10, an image-processing software storage-use memory 14 consisting of a ROM, and an image-processing software-use memory 15 consisting of a RAM. Image-processing software B is stored in the image-processing software storage-use memory 14, and this software B is loaded to the image-processing software-use memory 15 at the time of starting the personal computer 1.

A shared memory 16 and a bus controlling circuit 17, which are used for transmitting and receiving data to and from the CPU board 2 of the personal computer 1, are further installed in the image-processing board 11. By using the shared memory 16, setting data for an image process to be executed by the image-processing board 11 is sent from the CPU board 2, and the results of the image process executed by the image-processing board 11 are returned to the CPU board 2.

Moreover, as will be described later, in the case when a camera image, captured by the image capture memory 13, is transferred to the main memory 7 of the personal computer 1, the image data is further transferred to the extension bus 5 by the bus controlling circuit 17.

A piece of software, which controls the entire apparatus, is loaded to the main memory 7 in the personal computer 1 as one piece of application software that is operated by the CPU 6. The functions of this software are:

(1) to set a sequence of image processes to be executed;

(2) with respect to set image processes, to allocate those image processes to the main CPU 6 and the sub CPU 12 in the image-processing board 11 so as to be executed correspondingly;

(3) to transfer setting parameters for image processes to be executed in the sub CPU 12 to the sub CPU 12 through the shared memory 16; and (4) based upon the results of the image processes transferred from the image-processing board 11 and the results of the image processes executed by the main CPU 6, to carry out numerical operations and judgements so that some of the results required are displayed on a monitor (not shown) of the personal computer 1 or externally outputted by using the interface 4.

By using the image processing inspection apparatus having the above-mentioned construction, an inspection is carried out in accordance with a flow chart shown in FIG. 2. More specifically, when the start of the inspection is instructed by the interface 4 and an operation by the user, a captured image of a target is taken in the image capture memory 13 on the image-processing board 11 from the TV camera 11. At the same time, the camera image, taken in the image capture memory 13, is transferred to the main memory 7 of the personal computer 1 through the extension bus 5 (S1).

In the PCI bus architecture, since the bus is operated at 33 MHz with 32 bits, the maximum transfer rate is, in principle, given as 32×33 MHz/8=132 M bytes/sec. In an actual operation, it is approximately ¼ to ⅕ the theoretical value. Nevertheless, for example, in the case of the transfer of one screen 512×512 pixels×8 bits=256 K bytes, it is approximately 0.256/(132/5)≈10 ms. Since this value is shorter than 33.3 ms that is a capture time of the frame image, it is possible to actually carry out a real-time transfer process. Here, the image data transfer to the extension bus 5 at this time is carried out by the bus controlling circuit 17 on the image-processing board 11; therefore, loads imposed on the main CPU 6 of the personal computer 1 can be reduced.

When the image data is also stored in the main memory 7 of the personal computer 1 as described above, the main CPU 6 of the personal computer 1 and the sub CPU of the image-processing board 11 execute image processes respectively in parallel with each other by using the same image data. At this time, the mutual conditions of the image processes are set by the aforementioned software that is operated by the main CPU 6 of the personal computer 1 (that is, consideration is given to a case, such as a position correcting process, in which the process has a mutually dependent relationship, so as to allocate data for actual parallel processes).

In the present embodiment 1, the main CPU 6 of the personal computer 1 carries out the window process and the feature-extracting process (S2, S3) by using the image-processing software A, while the sub CPU 12 on the image-processing board 11 simultaneously carries out the matching process by using the image-processing software B (S4) In this case, parameters required for the matching process have been transferred preliminarily from personal computer 1 to the image-processing board 11.

The results of the matching process by the image-processing board 11 are sent to the CPU board 2 of the personal computer 1 through the shared memory 16, and, together with the results of the window process and the feature-extracting process that have been carried out by the CPU board 2, subjected to the post-processes, such as numerical operation and judging processes, a result displaying process and a result outputting process (S5 to S7). Then, the inspection for this target is completed, and an inspection for the next target is started.

As described above, in the present embodiment, the bus controlling circuit 17, which serves as an image transfer means, also transfers the camera image taken in the image capture memory 13 to the main memory 7. Moreover, the image-processing software A, which serves as a CPU operation controlling means, is loaded to the main memory 7 so as to allow the main CPU 6 to carry out image processes on the camera image stored in the main memory 7. Then, in accordance with the application software that has a function as a parallel-process controlling means, the image processes with respect to the camera image are carried out by the main CPU 6 and the sub CPU 12 in parallel with each other in a shared manner between the main CPU 6 and the sub CPU 12 serving as an image-processing means in the image-processing board 11.

Conventionally, as illustrated in FIG. 12, the image capture process, the image processes and the post-processes are carried out sequentially. Here, in general, the matching process (pattern matching) using normalized correlation is executed as a light and shade process, while the window process and the feature-extracting process are executed as binary image processes. For this reason, the matching process takes more time as compared with the window process and the feature-extracting process. Moreover, for example, in the case when the feature-extracting process needs to be executed by using the results of the execution of the window process, these processes have to be executed in a sequential manner. However, for example, the matching process can be executed in parallel with another image process without raising any problem; therefore, the conventional inspection sequence, which carries out even such a process in a sequential manner, fails to increase the speed performance as a whole.

In contrast, as described above, in the apparatus of the present embodiment, the same image data is taken in the personal computer 1 and the image-processing board 11; thus, the window process, the feature-extracting process and the matching process are shared by the personal computer 1 and the image-processing board 11 so that these processes are executed in parallel with each other. Therefore, the processing time is shortened as a whole, and it is possible to reduce loads imposed on the main CPU 6 of the personal computer 1.

Embodiment 2

FIG. 3 shows a construction of an image processing inspection apparatus in accordance with embodiment 2. Here, those members that have the same functions as those explained in FIG. 1 are indicated by the same reference numerals, and the detailed description thereof is omitted. The same is true for the other embodiments that will be discussed later.

In the present embodiment, two image-processing boards 11A and 11B, each having the same construction as the aforementioned construction, are connected to an extension bus 5 of a personal computer 1.

A TV camera 10 which is the same as that explained earlier is connected to one (specific one) of the image-processing boards (hereinafter, referred to as a main image-processing board 11A). The other image-processing board (hereinafter, referred to as sub image-processing board 11B) is only different from the main image-processing board 11A in that the TV camera 10 is not connected thereto.

In addition, image-processing software C is stored in an image-processing software storage-use memory 14 of the sub image-processing board 11B. This image-processing software C may be the same as image-processing software B stored in an image-processing software storage-use memory 14 of the main image-processing board 11A, or may have a separate function from the software B; that is, for example, the image-processing software B executes the feature-extracting process and the image-processing software C executes the matching process.

Upon starting the personal computer 1, the pieces of image-processing software B and C, which are stored in the respective image-processing software storage-use memories 14 and 14, are loaded to respective image-processing software-use memories 15•15.

In the same manner as described earlier, software for controlling the present image processing inspection apparatus is loaded to the main memory 7 of the personal computer 1 as a piece of application software that is operated by the main CPU 6. The functions of this software are:

(1) to set a sequence of image processes to be executed;

(2) with respect to set image processes, to allocate those image processes to the main CPU 6 and the sub CPUs 12•12 in the image-processing boards 11A and 11B so as to be executed correspondingly;

(3) to transfer setting parameters for image processes to be executed in the sub CPUs 12•12 to the sub CPUs 12•12 through the shared memories 16•16; and (4) based upon the results of the image processes transferred from the image-processing boards 11A and 11B and the results of the image processes executed by the main CPU 6, to carry out numerical operations and judgements so that some of the results required are displayed on a monitor (not shown) of the personal computer 1 or externally outputted by using the interface 4.

By using the image processing inspection apparatus having the above-mentioned construction, an inspection is carried out, for example, in accordance with a flow chart shown in FIG. 4. More specifically, when the start of the inspection is instructed, image data captured by the TV camera 10 is taken in the image capture memory 13 on the main image-processing board 11A. At the same time, the image data is transferred to the main memory 7 of the personal computer 1 and the image capture memory 23 in the sub image-processing board 21 through the extension bus 5 (S11).

Then, by using the image data having the same contents, the CPU board 2 of the personal computer 1 carries out the window process based upon the image-processing software A (S12), the main image-processing board 11A carried out the feature-extracting process based upon the image-processing software B (S13), and the sub image-processing board 11B carries out the matching process based upon the image-processing software C (S14); thus, these processes are carried out independently in parallel with each other. At this time, the mutual conditions of the image processes are set by the aforementioned software that is operated by the main CPU 6 of the personal computer 1. Moreover, parameters required for the image processes of the respective image-processing boards 11A and 11B have preliminarily been transferred to the respective image-processing boards 11A and 11B from the personal computer 1.

Upon completion of the feature-extracting process and matching process at the respective image-processing boards 11A and 11B, the results of these processes are sent to the CPU board 2 of the personal computer 1 through shared memories 16•16, and, together with the results of the window process executed in the CPU board 2, subjected to post-processes in accordance with the aforementioned software (S15 to S17).

Additionally, the above-mentioned embodiment exemplifies a case in which the sub image-processing board 11B is connected to the extension bus 5 in addition to the main image-processing board 11A; however, the same explanation is applied to another case in which two or more sub image-processing boards are inserted thereto.

Embodiment 3

FIG. 5 shows a construction of an image processing inspection apparatus in accordance with embodiment 3. In this apparatus also, a plurality of image-processing boards 11•11 (two in the case of the Figure) are connected to an extension bus 5 of the personal computer 1.

Each of the image-processing boards 11•11 has the same construction as those described earlier, and the present embodiment is different from embodiment 2 in that TV cameras 10•10 are respectively connected to the image-processing boards 11, 11.

Image-processing software B is stored in one of the image-processing software storage-use memories 14•14 of the image-processing boards 11•11, and image-processing software C is stored in the other thereof. These pieces of software B and C may have the same contents in the same manner as described above, or may have different processing contents based upon camera images that are taken in through the respective TV cameras 10•10.

In the same manner as described earlier, software for controlling the present image processing inspection apparatus is loaded to the main memory 7 of the personal computer 1 as a piece of application software that is operated by the main CPU 6. The functions of this software are:

(1) to set a sequence of image processes to be executed for each of camera images;

(2) with respect to set image processes, to allocate those image processes to the main CPU 6 and the sub CPUs 12•12 in the image-processing boards 11•11 so as to be executed correspondingly;

(3) to transfer setting parameters for image processes to be executed in the sub CPUs 12•12 to the sub CPUs 12•12 through the shared memories 16•16; and (4) based upon the results of the image processes transferred from the image-processing boards 11•11 and the results of the image processes executed by the main CPU 6, to carry out numerical operations and judgements so that some of the results required are displayed on a monitor of the personal computer 1 or externally outputted by using the interface 4.

By using the image processing inspection apparatus having the above-mentioned construction, an inspection is carried out, for example, in accordance with a flow chart shown in FIG. 6. More specifically, when the inspection is started, images captured by the TV cameras 10•10 are taken in the image capture memories 13•13 on the image-processing boards 11•11. At the same time, the image data is transferred to the main memory 7 of the personal computer 1 through the extension bus 5 (S21, S22).

Then, with respect to the image data taken in one of the image-processing board 11, the main CPU 6 of the personal computer 1 carries out the window process and the feature-extracting process (S23, S24) by using the image-processing software A, while the sub CPU 12 on the corresponding image-processing board 11 simultaneously carries out the matching process by using the image-processing software B in a parallel manner (S25).

Moreover, with respect to the image data taken in the other image-processing board 11, the main CPU 6 carries out, for example, an edge-detection process and the feature-extracting process (S26, S27), while the sub CPU 12 on the corresponding image-processing board 11 simultaneously carries out the matching process by using the image-processing software C in a parallel manner (S28). Here, the edge-detection process refers to a process in which coordinates of an edge are found within a set area based upon a binarizing process or a light and shade process.

At this time, the mutual conditions of the image processes are set by the aforementioned software that is operated by the main CPU 6 of the personal computer 1.

The results of the image processes in the respective image-processing boards 11•11 are sent to the CPU board 2 through the shared memories 16•16, and, together with the results of the image processes such as the window process executed in the CPU board 2, subjected to post-processes in accordance with the aforementioned software (S29 to S31).

In this manner, in the present embodiment, both of the image-processing boards 11•11 execute the matching processes which take a relatively long processing time, and all the other image processes are executed by the main CPU 6 of the personal computer 1. In this case, although loads on the main CPU 6 increase to be approximately double as compared with embodiment 1, the loads are relatively light as compared with a case in which the CPU 6 executes all processes including the matching process.

Here, the above-mentioned embodiment exemplifies a case in which two image-processing boards 11 are connected; however, the explanation is applied to another case in which three or more image-processing boards are inserted, in the same manner.

Moreover, the above embodiment exemplifies a case in which all the image data stored in the respective image capture memories 13•13 is transferred to the main memory 7 in the personal computer 1; however, since the amount of data transferred increases as the number of image-processing boards increases, desired image data of a single image-processing board 11 or a plurality of specific image-processing boards 11, which is to be processed by the CPU board 2 of the personal computer 1, may be transferred in a limited manner.

In this case, the CPU board 2 of the personal computer 1 transmits a request for data transfer through the extension bus 5 to the bus controlling circuit 17 of the image-processing board 11 from which the image data is required to be transferred, and when an image is taken in the image-processing board 11, the bus controlling circuit 17 controls the extension bus 5 so as to transfer the image data to the CPU board 2 at high speeds.

Embodiment 4

FIG. 7 shows the construction of an image processing inspection apparatus in accordance with embodiment 4. This apparatus is provided with two personal computers 1A and 1B. Each of these has the same construction as the personal computer 1 shown in FIG. 1, and to an extension bus 5A of one of the personal computers (hereinafter, referred to as a first personal computer 1A) are inserted a main image-processing board 11A to which a TV camera 10 is connected and a plurality of sub image-processing board 11B. These main image-processing board 1A and sub image-processing boards 11B respectively have the same constructions as the main image-processing board 11A and the sub image-processing board 11B shown in FIG. 3 (hereinafter, the first personal computer 1A, the respective image-processing boards 11A and 11B connected thereto and the TV camera 10 are collectively referred to as a first unit U1).

To an extension bus 5B of the other personal computer (hereinafter, referred to as a second personal computer 1B) are inserted a plurality of sub image-processing boards 11B, each having the same construction as described above (hereinafter, the second personal computer 1B and the sub image-processing boards 11B are collectively referred to as a second unit U2).

Moreover, the extension buses 5A and 5B are directly connected to each other so that the CPU boards 2A and 2B of the respective personal computers 1A and 1B are connected to each other.

Furthermore, software for controlling the present image processing inspection apparatus is loaded to the main memory (not shown) of the first personal computer 1A as a piece of application software that is operated by the main CPU (not shown) of the first personal computer 1A.

The functions of this software are:

(1) to set a sequence of image processes to be executed;

(2) with respect to the set image processes, to allocate those image processes to the CPU board 2A, the CPU board 2B, the main image-processing board 11A and the respective sub image-processing boards 11B so as to be respectively executed therein;

(3) to transfer setting parameters for image processes to be executed in the respective sub CPUs (not shown) of the main image-processing board 11A and the sub image-processing boards 11B to the main image-processing board 11A and the sub image-processing boards 11B through the shared memories on the respective boards 11A and 11B. Moreover, the setting of image processes to be executed in the CPU board 2B of the second personal computer 1B is directly transmitted to the main memory of the CPU board 2B through the extension buses 5A and 5B; and (4) based upon the results of the image processes executed by the main image-processing board 11A and the respective sub image-processing boards 11B and the results of the image processes executed by the respective CPU boards 2A and 2B, to carry out numerical operations and judgements so that some of the results required are displayed on a monitor of the personal computer 1A or externally outputted by using the interface.

In the apparatus arranged as described above, an image captured by the TV camera 10 is first stored in the image capture memory on the main image-processing board 11A as image data. Simultaneously, the image data is transferred to the memory of the first personal computer 1A through the extension bus 5A, and also transferred to the image capture memories of the respective sub image-processing board 11B within the first unit U1. Moreover, it is further transferred to the second unit U2 through the extension buses 5A and 5B so as to be stored in the main memory on the CPU board 2B of the second personal computer 1B and image capture memories of the respective sub image-processing boards 11B.

Then, the allocated image processes are carried out in parallel with each other by the respective CPUs, and the results are transferred to the CPU board 2A of the first personal computer 1A in which based upon the results of the processes, processes such as numerical operations and judgements are carried out.

Additionally, in the above-mentioned embodiment, the software for controlling the entire system is operated on the CPU board 2A of the first personal computer 1A; however, this operation may be carried out in the second personal computer 1B.

Moreover, the above-mentioned description exemplified the case in which the two sets of units, each constituted by image-processing boards connected to a personal computer, are prepared; however, the same explanation is applied to cases in which three sets or more are connected to each other.

Furthermore, in the above-mentioned arrangement, the respective units are separated from each other for each personal computer; however, another arrangement may be adopted in which a plurality of CPU boards and a plurality of image-processing boards are inserted to the mother boards of extension buses of one personal computer in a collective form as a whole.

In the above-mentioned embodiment, the image processes are allocated to all the CPU boards and the image-processing boards; however, the following software arrangements may be adopted:

(a) The CPU board 2A of the first personal computer 1A takes care of portions (post-processing) for controlling the sequence of set image processes and for providing outputs based upon the results of the image processes thus executed, and the CPU board 2B of the second personal computer 1B and the respective image-processing boards 11A, 11B, etc. carry out the image processes.

(b) The CPU board 2A of the first personal computer 1A controls the set sequence of image processes, the CPU board 2B of the second personal computer 1B takes care of portions (post-processing) for providing outputs based upon the results of the image processes thus executed, and the respective image-processing boards 11A and 11B carry out the image processes.

Embodiment 5

FIG. 8 shows the construction of an image processing inspection apparatus in accordance with embodiment 5. This apparatus also is provided with a plurality of personal computers 1, and the respective CPU boards 2 of these personal computers 1 are directly connected to each other by extension buses 5. This arrangement is different from that of embodiment 4 in that a plurality of image-processing boards 11, each having a TV camera 10 connected thereto, are connected to each personal computer 1. Here, all the image-processing boards 11 are not necessarily provided with TV cameras.

In this apparatus, a plurality of camera images are transferred to the respective CPU boards 2 through the extension buses 5. In this case also, in the same manner as embodiment 4, software for controlling the present apparatus is loaded to the main memory of any one of the personal computers 1 as a piece of application software that is operated in the main CPU. Moreover, processes may be allocated to the CPU boards of the plural personal computers in a manner as shown in (a) and (b) of embodiment 4.

Embodiment 6

Next, an explanation will be given of an image inspection apparatus in accordance with embodiment 6 of the present invention. The construction of this apparatus is the same as the apparatus construction explained by reference to, for example, FIG. 1. Therefore, the explanation will be given while referring to the respective constituent parts that have been discussed using the Figure.

In this apparatus, an inspection is carried out following a sequence shown in a flow chart in FIG. 9.

When the inspection is started, an image captured by the TV camera 10 is taken in the image capture memory 13 on the image-processing board 11 in the same manner as described earlier (S41), and a sequence of image processes such as the aforementioned window process, feature-extracting process and matching process are executed by the sub CPU 12 of the image-processing board 11 (S42). Here, in the present embodiment, pre-processes such as image filtering are included in the image processes, and these are executed by the image-processing board 11.

Then, the results of these image processes are transferred to the CPU board 2 of the personal computer 1, and based upon the results, post-processes, such as numerical operations and judgements, displaying of the results and outputting of the results, are executed by the CPU board 2 (S43 to S45).

After outputting the results of the image processes, the image-processing board 11 captures an image of the next target (S46), and successively carries out the same image processes as described above (S47). Therefore, during this period, the post-processes at the CPU board 2 and the image processes at the image-processing board 11 are executed in parallel with each other, and thereafter, parallel processes of this type are carried out.

In this manner, by assigning jobs so that the image-processing board 11 carries out an image data capture process and image processes while the CPU board 2 of the personal computer 1 carries out the post-processes based upon the results of the image processes, it becomes possible to provide pipeline processes. The reason for this is that upon completion of the image processes at the image-processing board 11, the image data is no longer required, with the result that the image-processing board 11 is allowed to capture a new image for the next inspection. In other words, upon completion of the image processes at the image-processing board 11, the results that are required are transferred to the main memory 7 of the personal computer 1 through the shared memory 16, and simultaneously with this operation, the image-processing board 11 is allowed to start the next image capture process and initiate the image processes.

In general, since the post-processes have less amount of calculations as compared with the image processes, it becomes possible to reduce loads imposed on the main CPU 6, and consequently to simultaneously operate general-use application software without causing stress.

In the case when the inspection is repeated as fast as possible, the inspection time T for one cycle is represented as follows in the case of the conventional sequence of processes shown in FIG. 12:

T=[Image capture time]+[Image processing time]+[Post-processing time] In contrast, in the present embodiment, (i) if [Image capture time]+[Image processing time]≧[Post-processing time], the inspection time T for one cycle is represented by:

T=[Image capture time]+[Image processing time], and (ii) if [Image capture time]+[Image processing time]<[Post-processing time], the inspection time T for one cycle is represented by:

T=[Post-processing time]

Therefore, with an arrangement in which software serving as a pipeline process control means for carrying out the above-mentioned pipeline process is installed as one piece of application software that is operated in the main CPU 6 of the personal computer 1, it becomes possible to shorten the inspection process time as a whole, and consequently to reduce the loads imposed on the main CPU 6.

Additionally, the above-mentioned pipeline process may be carried out by using the apparatus construction of embodiment 2 explained by reference to FIG. 3. In this case, the image processes in the respective image-processing boards 11A and 11B are executed in parallel with each other, and upon completion of all the image processes of the image-processing boards 11A and 11B, sine the image data is no longer necessary, a new-image capture operation for the next inspection is available. In other words, when the image processes of all the image-processing boards 11A and 11B have been completed, some of the results that are required are transferred to the main memory 7 of the personal computer 1 through the shared memories 16•16, and the next image capture operation is started simultaneously with this operation; thus, it becomes possible to shorten the inspection time as a whole.

Moreover, the above-mentioned pipeline process may be carried out by using the apparatus construction of embodiment 3 explained by reference to FIG. 5. In this case also, the image processes in the respective image-processing boards 11 are executed in parallel with each other, and immediately after the results are transferred to the main memory 7 of the personal computer 1 through the shared memories 16·16, the next image capture operation is started and the image processes are initiated.

The above-mentioned description explained specific embodiment of the present invention; however, the present invention is not intended to be limited by the respective embodiments. For example, the above-mentioned embodiments explained cases in which the image-processing means in the image-processing boards 11, 11A and 11B is constituted by image-processing software stored in the image-processing software storage-use memory 14 and the sub CPU 12 operated by this; however, the image-processing means may be constituted by exclusive hardware such as gate arrays.

Moreover, in the above-mentioned embodiments, no specific explanation was given to pre-processes of the image processes; however, the present invention is applicable to a case in which predetermined pre-processes, such as rotation of an image, expansion and contraction filters for a binarized image, etc., are applied to an image from the TV camera.

INDUSTRIAL APPLICABILITY

The present invention is provided with a means for transferring image data captured by a TV camera to the main memory of a personal computer, a memory for storing the image data on an image-processing board that is inserted to an extension bus, and an exclusive CPU or hardware for carrying out image processes, a single or a plurality of which are installed therein; thus, it is possible to provide an image processing detection apparatus which can achieve high-speed processes in the entire apparatus and reduce loads imposed on the CPU of the personal computer on demand.

What is claimed is:

1. An image processing inspection apparatus, comprising:
   a TV camera;
   an image processing board connected to said TV camera, said image processing board having an image capture memory that stores an image captured by said TV camera and having an image-processing means for carrying out image processing on the image stored in said image capture memory;
   a central processing control device having an extension bus, a main CPU, and a main memory, said image-processing board being connected to said extension bus;
   image-transfer means for transferring the image stored in the image capture memory to said main memory;
   CPU operation controlling means for providing control so that said main CPU carries out image processing on the image that has been transferred to said main memory; and
   parallel process controlling means for providing control so that said main memory and said image-processing means carry out image processing on the image captured by the TV camera in a shared manner;

wherein the image processing includes at least one of a windowing process, a feature extraction process, and a matching process, and, as the parallel processing, said main CPU carries out at least one of the windowing process, the feature extraction process, and the matching process at the same time that the image-processing means carries out a different at least one of the windowing process, the feature extraction process, and the matching process.

2. An image processing inspection apparatus as claimed in claim 1, wherein said central processing control device is a personal computer.

3. An image processing inspection apparatus as claimed in claim 1, wherein said image-processing means comprises a memory for storing image-processing-use software, and a CPU that operates in accordance with said software.

4. An image processing inspection apparatus as claimed in claim 1, wherein said parallel process controlling means comprises control-use software stored in said main memory and said main CPU operates in accordance with said software.

5. An image processing inspection apparatus as claimed in claim 1, further comprising:
   an output device configured to output results of the image processing.

6. An image processing inspection apparatus as claimed in claim 1, further comprising an image capture memory and a sub image-processing board connected to said extension bus, wherein the image which has been captured by the image capture memory of said image-processing board is transferred to the image capture memory, and the sub image-processing board carries out image processing on the image captured by said image capture memory, in a shared manner.

7. An image processing inspection apparatus as claimed in claim 1, further comprising:
   a plurality of said image-processing boards are connected to the extension bus, and
   wherein said image-transfer means and parallel process controlling means provide control so that image-processing means of the respective image-processing boards and the main CPU carry out image processing on the respective images that have been captured by TV cameras connected to the respective image-processing boards, in a shared manner.

8. An image processing inspection apparatus as claimed in claim 1, further comprising:
   a second extension bus of a second central processing control device having a second main CPU and a second main memory directly connected to the extension bus of said central processing control device, and
   wherein said image-transfer means and parallel process controlling means provide control so that the camera image, captured by the image capture memory of said image-processing board, is sent to the second main memory of said second central processing control device so as to allow the second main CPU of said second central processing control device to carry out image processing in a shared manner.

9. An image processing inspection apparatus as claimed in claim 8, further comprising:
   a second image capture memory and a second sub image processing board are connected to the second extension bus of said second central processing control device,
   wherein the image that has been captured by the image capture memory of said image-processing board is transferred to the second image capture memory, and the second sub image processing board includes a second image-processing means for image processing on the image captured by said memory in a shared manner.

10. An image processing inspection apparatus as claimed in claim 8, further comprising:
   an image-processing board having a same construction as said image-processing board connected to an extension bus of said second central processing control device, and
   wherein said image-transfer means and parallel process controlling means provide control so that image-processing means of the respective image-processing boards and the main CPUs of the respective central processing control devices carry out image processing on the respective images that have been captured by TV cameras that are connected to the respective image-processing boards, in a shared manner.

11. An image processing inspection apparatus, comprising:
   a TV camera;
   an image processing board connected to said TV camera, said image processing board having an image capture memory that stores an image captured by said TV camera and having an image-processing means for carrying out image processing on the camera image stored in said image capture memory;
   a central processing control device having an extension bus, a main CPU, and a main memory, said image-processing board being connected to said extension bus;
   an image-transfer means for transferring the image stored in the image capture memory to said main memory;
   wherein in a post-process for outputting results of an inspection based upon results of the image processing a pipeline process controlling means is provided so that, when said central processing control device starts to carry out the post-process based upon the results of the image processing by said image-processing board, said image-processing board is allowed to carry out image processing on a camera image captured by a next TV camera in a parallel manner, and
   wherein the image processing includes at least one of a windowing process, a feature extraction process, and a matching process, and, as the parallel processing, said main CPU carries out at least one of the windowing process, the feature extraction process, and the matching process at the same time that the image-processing means carries out a different at least one of the windowing process, the feature extraction process, and the matching process.

12. An image processing inspection method for an image processing apparatus that includes an image-processing board to which a TV camera is connected, the image-processing board being connected to an extension bus of a central processing control device, said method comprising:
   storing an image captured by the TV camera in an image capture memory on the image-processing board;
   carrying out image processing on the camera image stored in the image capture memory;
   outputting results of the inspection; and
   transferring the camera image to the main memory of the central processing control device so as to allow the main CPU inside the central processing control device to also carry out the image processing on the camera image, thereby carrying out the image processing by using the main CPU and the image-processing board in parallel with each other in a shared manner;

wherein the image processing includes at least one of a windowing process, a feature extraction process, and a matching process, and, as the parallel processing, said main CPU carries out at least one of the windowing process, the feature extraction process, and the matching process at the same time that the image processing board carries out a different at least one of the windowing process, the feature extraction process, and the matching process.

13. An image processing inspection method for an image processing apparatus that includes an image-processing board to which a TV camera is connected, the image-processing board being connected to an extension bus of a central processing control device, said method comprising:

storing an image captured by the TV camera in an image capture memory on the image-processing board;

carrying out image processing on the camera image stored in the image capture memory;

carrying out post-processing for outputting results of the inspection based upon results of the image processing; and carrying out a pipeline process so that, when the central processing control device starts to carry out the post-processing based upon the results of the image processing by the image-processing board, said image-processing board processes a camera image captured by a next TV camera in a parallel manner;

wherein the image processing includes at least one of a windowing process, a feature extraction process, and a matching process, and, as the parallel processing, said central processing control device carries out at least one of the windowing process, the feature extraction process, and the matching process at the same time that the image-processing board carries out a different at least one of the windowing process, the feature extraction process, and the matching process.

* * * * *